US010195008B2

(12) United States Patent
Mikkelsen et al.

(10) Patent No.: US 10,195,008 B2
(45) Date of Patent: Feb. 5, 2019

(54) SYSTEM, DEVICE AND METHOD FOR OBSERVING PIGLET BIRTH

(71) Applicant: FARROWTECH APS, Aarhus N (DK)

(72) Inventors: Morten Bo Lindholm Mikkelsen, Vanløse (DK); Jakob Boss Skårhøj, Ballerup (DK)

(73) Assignee: FARROWTECH APS, Aarhus N (DK)

( * ) Notice: Subject to any disclaimer, the term of this patent is extended or adjusted under 35 U.S.C. 154(b) by 0 days.

(21) Appl. No.: 15/554,467

(22) PCT Filed: Mar. 3, 2016

(86) PCT No.: PCT/EP2016/054604
§ 371 (c)(1),
(2) Date: Aug. 30, 2017

(87) PCT Pub. No.: WO2016/139323
PCT Pub. Date: Sep. 9, 2016

(65) Prior Publication Data
US 2018/0071069 A1  Mar. 15, 2018

(30) Foreign Application Priority Data
Mar. 3, 2015  (DK) .................................. 2015 00129

(51) Int. Cl.
*A61D 17/00* (2006.01)
*A01K 1/02* (2006.01)
*A01K 29/00* (2006.01)
*G01V 8/10* (2006.01)
*G06K 9/00* (2006.01)

(52) U.S. Cl.
CPC .......... *A61D 17/008* (2013.01); *A01K 1/0218* (2013.01); *A01K 29/005* (2013.01); *G01V 8/10* (2013.01); *G06K 9/00362* (2013.01); *G06K 9/00771* (2013.01)

(58) Field of Classification Search
CPC ............................ A61D 17/008; A01K 1/0218
USPC .......................................................... 348/135
See application file for complete search history.

(56) References Cited

U.S. PATENT DOCUMENTS

2008/0266115 A1* 10/2008 Labrecque ........... A01K 1/0218
340/573.3
2014/0015945 A1  1/2014 Bench et al.

FOREIGN PATENT DOCUMENTS

EP  2786655  10/2014

OTHER PUBLICATIONS

Vintner, J.: "Landsgennemsnit for produktivitet i svineproduktionen 2013". notat nr. 1422. Videncenter for Svineproduktion. (Jun. 19, 2014).

(Continued)

*Primary Examiner* — Jeffery A Williams
(74) *Attorney, Agent, or Firm* — Duane Morris LLP; J. Rodman Steele, Jr.; Gregory M. Lefkowitz

(57) ABSTRACT

A system and a method for observing piglet birth is provided. The method comprises detecting at a first detection zone, infrared electromagnetic radiation from a first radiation zone including at least a first area of a first delivery zone of a first farrowing sow or gilt, identifying a first event indicative variation in the detected infrared electromagnetic radiation, the first event indicative variation being indicative of a piglet birth, and determining a first piglet birth event by means of the identification of the first event indicative variation.

17 Claims, 8 Drawing Sheets

(56) References Cited

OTHER PUBLICATIONS

Lene J. Pedersen, Peer Berg et al., Pattegrised¢delighed i DK—Muligheder for reduktion of pattegrisd¢deligheden i Danmark, Aarhus Universitet, Det Jordbrugs-videnskabelige Fakultet, 2010. DJF Rapport—Husdyrbrug, vol. 86. ISBN 87-91949-58-0. (see pp. 6-7).

EuroTier 2010: Innovation for the Farrowing Area: "Automatic birth monitoring with SowCam", (Aug. 11, 2010) Big Dutchman Pig Equipment GmbH: http://www.bigdutchman.com/en/pig-production/news/detail/automatic-birth-monitoring-with-sowcam.html.

Teknologisk Institut—StaldTek: "Monitoring Farrowing Sows—An automatic birth monitoring system based on visual cameras has been proposed by the innovation consortium" StaldTek: http://www.teknologisk.dk/projekter/staldtek-overvaagning-af-farende-soeer/32918.

ScrofaTech: "Maternity Protector—An automatic birth monitoring and alarm system based on visual cameras" (ScrofaPARTUM): http://scrofatech.com/uploads/catalog/ScrofaPartum.pdf.

* cited by examiner

SYSTEM, DEVICE AND METHOD FOR OBSERVING PIGLET BIRTH

CROSS-REFERENCE TO RELATED APPLICATIONS

This application is a § 371 national stage entry of International Application No. PCT/EP2016/054604, filed Mar. 3, 2016, which claims priority to Danish Patent Application PA 2015 00129, filed Mar. 3, 2015, the entire contents of which are incorporated herein by reference.

FIELD OF TECHNOLOGY

The present invention relates to observation of piglet birth by one or more farrowing sows or gilts. More particularly, the present invention relates to a method for observing piglet birth. Furthermore, the present invention relates to a system configured for observing piglet birth. Furthermore, the present invention relates to a device configured for observing piglet birth.

BACKGROUND

As a consequence of intensive pig breeding, in which breeding programs through generations have resulted in sows producing increasingly large litters, the number of stillborn piglets has increased as well as the number of live-born piglets dying after birth. In Denmark in 2013 it was calculated that 22.3% of the born piglets die within the first three weeks of their lives. A total of 9.9% of the piglets were stillborn (cf. Jens Vinther, "Landsgennemsnit for produktivitet i svineproduktionen 2013", "Videncenter for Svineproduktion", memorandum no. 1422, 19 Jun. 2014). The high piglet mortality is a problem for ethical as well as animal welfare and economic reasons.

Research has shown that the piglet mortality can be approximately halved by intensive supervision of the farrowing sows and providing of obstetric aid when time intervals between subsequent piglet births exceed a given length (Lene J. Pedersen, Peer Berg et al., "Pattegrisedødelighed i DK—Muligheder for reduktion af pattegrisdødeligheden i Danmark", Aarhus University, "Det Jordbrugsvidenskabelige Fakultet", 2010. "DJF Rapport—Husdyrbrug", Vol. 86. ISBN 87-91949-58-0). Intensive supervision of farrowing sows is very labor demanding when carried out manually. Typically, farrowing sows are only inspected a few times during the day, and it is thus difficult to estimate the time intervals between subsequent births and to provide obstetric aid in time.

An automatic birth monitoring system based on visual cameras (SowCam), which measures the time interval between subsequent births, is known from EP 2786655 A1 and disclosed by Big Dutchman Pig Equipment GmbH: http://www.bigdutchman.com/en/pig-production/news/detail/automatic-birth-monitoring-with-sowcam.html An automatic birth monitoring system based on visual cameras has been proposed by the innovation consortium StaldTek: http://www.teknologisk.dk/projekter/staldtek-overvaagning-af-farende-soeer/32918

An automatic birth monitoring and alarm system based on visual cameras (ScrofaPARTUM) has been proposed by ScrofaTech: http://scrofatech.com/uploads/catalog/Scrofa-Partum.pdf A birth monitoring system for piglets is known from WO 2008/092258 A1. This system use IR thermal sensing of a piglet to turn on a heating lamp. Only the first piglet is detected using an IR point detection.

Thermographic imaging of livestock is known from US 2014/0015945 A1 and US 20040019269 A1, where it is used, e.g., for detection of inflammations, onset of puberty and estrus.

Measurement of the surface temperature of a sow is known from WO 2009/074153, where it is used to predict the time of birth.

SUMMARY

An automated system for supervision of farrowing sows is needed in order for farmers to be able reduce the piglet mortality in a cost-efficient manner.

It is an object of the present invention to provide an alternative method, system, and device configured for observing piglet birth.

Furthermore, it is an object of the present invention to provide a method, a system, and a device, which can facilitate to reduce the number of stillborn piglets and piglets dying during the first weeks of their life, such as during the first hours of their life.

According to a first aspect of the present invention there is provided a method for observing piglet birth. The method comprises detecting, at a first detection zone, infrared electromagnetic radiation from a first radiation zone including at least a first area of a first delivery zone of a first farrowing sow or gilt. The method comprises identifying a first event indicative variation in the detected infrared electromagnetic radiation, wherein the first event indicative variation is indicative of a piglet birth. The method comprises determining a first piglet birth event by means of the identification of the first event indicative variation.

According to a second aspect of the present invention there is provided a system configured for observing piglet birth. The system comprises a first detector configured for detecting, at a first detection zone, infrared electromagnetic radiation from a first radiation zone including at least a first area of a first delivery zone of a first farrowing sow or gilt. The system comprises processing means configured for identifying a first event indicative variation in the detected infrared electromagnetic radiation, wherein the first event indicative variation is indicative of a piglet birth. The processing means are configured for determining a first piglet birth event by means of the identification of the first event indicative variation.

It is an advantage of the present invention that the detection of electromagnetic radiation may function without a light source.

It is an advantage of the present invention that a cost-efficient and/or simple method and/or device and/or system is provided. For instance, the invention may be effectuated using a simple detector that does not form an image but merely detects the relevant radiation. Alternatively, the invention may be effectuated by a simple use of a more complex detector, which detector may be suitable for obtaining an image. For instance, an average value of a plurality of pixels within an image may be used for the present invention. The invention may be cost-efficient since a light source may not be needed. The invention may be cost-efficient since manpower is not needed for monitoring the farrowing sows.

It is an advantage of the present invention that it has improved reliability. For instance, the invention may function at any time (at day or night).

According to Planck's Law, all objects emit electromagnetic radiation with a radiance and a wavelength spectrum that depend on the surface temperature and the emissivity of the object. For objects with a surface temperature in the range of 37 degrees Celsius, electromagnetic radiation is emitted primarily at wavelengths in the interval between 3 µm and 30 µm, such as between 7 µm and 15 µm. Accordingly, when imaging/detecting electromagnetic radiation from an object within these wavelengths the irradiance depends on the surface temperature and the emissivity of the object. This may be referred to as thermography. In a thermographic image, the pixel value may thus reflect a combination of the surface temperature and the emissivity of the object.

At birth of a piglet, the piglet has a surface temperature of approximately 38 degrees Celsius, corresponding to the core temperature of the farrowing sow or gilt (may simply be referred to as "sow" in the following). The general surface temperature of the sow and of older piglets from the same litter is approximately 30-35 degrees Celsius. The advantage of using infrared electromagnetic radiation for detecting piglets at birth (i.e. during and immediately after, such as within the first 2 minutes after birth) is that discrimination between an image region representing a newborn piglet and image regions representing the sow or an older piglet from the same litter is facilitated, since an image region representing a newborn piglet may have a higher distribution of pixel values than an image region representing, for example, an older piglet. A newborn piglet may thus be detected as an image region having a certain size and having a distribution of pixel values in a certain range.

Furthermore, the use of wavelengths in an interval between 3 µm and 30 µm, such as between 7 µm and 15 µm, for the detection of piglets makes the method independent of a light source, such as a light source in the infrared area (or for detection of radiation in the visible range: a light source in the visible area), since the detected electromagnetic radiation emitted from the observed objects are generated by the observed objects themselves and not based on one or more external light source. This is in contrast to imaging techniques using electromagnetic radiation in the visible or near-infrared spectrum, which only observe radiation reflected from the surface of objects, and which hence rely on a radiation source, such as a light source emitting radiation in the desired range of the electromagnetic spectrum.

BRIEF DESCRIPTION OF THE DRAWINGS

Other and further aspects and features will be evident from reading the following detailed description of the embodiments.

The drawings illustrate the design and utility of embodiments, in which similar elements may be referred to by common reference numerals. However, similar elements may also be referred to by different reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope. The present invention is described by means of the following figures, which may be schematic. The figures are exemplary of the invention.

DETAILED DESCRIPTION OF THE DRAWINGS

Figure 1:
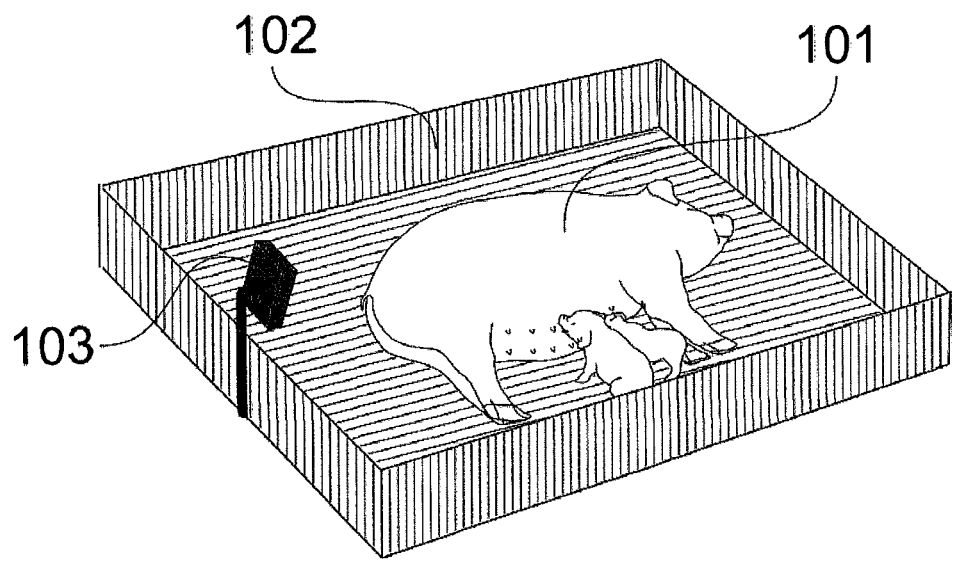
FIG. 1 schematically illustrates a deployed system including a device according to the present invention.

Various illustrative examples of the new method, system, and device for detecting piglet birth according to the appended claims will now be described more fully hereinafter with reference to the accompanying drawings, in which various embodiments of new systems, devices, and methods are illustrated. The new method, system, and device according to the appended claims may, however, be embodied in different forms and should not be construed as limited to the embodiments set forth herein. In addition, an illustrated embodiment needs not have all the aspects or advantages shown. An aspect or an advantage described in conjunction with a particular embodiment is not necessarily limited to that embodiment and can be practiced in any other examples even if not so illustrated, or if not so explicitly described. It should also be noted that the accompanying drawings may be schematic and simplified for clarity, and they may merely show details, which are essential to the understanding of the new method, system, and device, while other details may have been left out.

As used herein, the singular forms "a," "an," and "the" refer to one or more than one, unless the context clearly dictates otherwise.

In the following description, identical reference numbers refer to identical parts and/or features and/or steps of the present invention.

A farrowing sow or gilt may simply be referred to as a sow.

Observing may include any means for or any form of observation, detection means, etc.

Piglet birth may refer to the birth of an entire litter by a sow. Alternatively, piglet birth may refer to one piglet birth, such as the first piglet birth, or a plurality of piglet births including the first piglet birth and one or more piglet birth being subsequent thereof. The number of piglets borne within the same litter may be 15 or around 15 such as 10 to 25.

The first piglet birth may refer the birth of the first piglet of a presumed litter of piglets being born by a sow. Additionally, or alternatively, the first piglet birth may refer to any first detection/identification of a piglet birth by a particular sow, which may not be the actual first piglet of the litter being born by the sow.

Detecting infrared electromagnetic radiation may include generation and measuring of an electric current, which current may correspond to a characteristic of the incident radiation, which characteristic may include the irradiance of the radiation.

A zone may refer to one or more areas and/or one or more regions.

A radiation zone may refer to a zone that radiates electromagnetic radiation, in particular infrared electromagnetic radiation.

An area of a zone may refer to one or more parts and/or regions of the zone, such as the entire zone.

A detection zone may refer to one or more areas where incident radiation may be detected, in particular incident infrared electromagnetic radiation.

Identifying may include processing. Identifying may include one or more verification steps checking that one or more criteria are meet, such as a threshold value.

An event indicative variation may refer to a variation that fulfills certain criteria(s) or exceeds certain limits.

An event indicative variation being indicative of a piglet birth may mean that by identifying such an event indicative variation, there are sufficient indications that a piglet birth has taken place and that this particular piglet birth is the reasons for the one or more variations in the detected infrared radiation, which one or more variations are an event indicative variation.

Determining, such as determining a piglet birth event by means of the identification of the respective event indicative variation, may include processing.

The system according to the present invention may be distributed over a plurality of devices and/or other systems.

A detector according to the present invention may comprise or be an infrared detector. A detector may comprise or be a thermal detector. Several different types of detectors may be applied according to the present invention. In particular a detector that is sensitive in the above-mentioned (and below-mentioned) range of particular interest (such as wavelengths in an interval between 3 µm and 30 µm, such as between 7 µm and 15 µm) may be used.

The processing means may include one or more processors or signal/image processors.

Processing, including image processing, may be performed by dedicated hardware or may be performed in a signal/image processor, or performed in a combination of dedicated hardware and one or more signal processors.

As used herein, the terms "processor", "signal processor", may refer to CPU-related entities, either hardware, a combination of hardware and software, software, or software in execution.

For example, a "processor", "signal processor", may be, but is not limited to being, a process running on a processor, a processor, an object, an executable file, a thread of execution, and/or a program.

By way of illustration, the terms "processor", "signal processor", may designate both an application running on a processor and a hardware processor. One or more "processors", "image processors", or any combination hereof, may reside within a process and/or thread of execution, and one or more "processors", "signal processors", may be localized in one hardware processor, possibly in combination with other hardware circuitry, and/or distributed between two or more hardware processors, possibly in combination with other hardware circuitry.

"Infrared electromagnetic radiation" may according to the present invention refer to the so-called Mid-Wavelength Infrared (MWIR) and/or Long-Wavelength Infrared (LWIR), which is also referred to as DIN IR-C, i.e. radiation having a wavelength of 3-50 µm. Of particular interest may be the thermal radiation, in particular the electromagnetic radiation emitted at wavelengths in the interval between 3 µm and 30 µm, such as between 7 µm and 15 µm.

The method may comprise analyzing the detected infrared electromagnetic radiation.

The method may comprise providing an indication to a user that a sow, such as a particular sow, has given birth to a piglet, such as having given birth to a first piglet.

The method may comprise counting the number of piglets borne by a sow within a litter.

The method may comprise counting the number of dead piglets borne by a sow within a litter.

The method may comprise providing an indication to a user how many piglets a sow have given birth to. This may be updated for each birth.

The method according to the present invention may comprise determining a first piglet birth time, which first piglet birth time relates to the first piglet birth event. The first piglet birth time may for instance be the time of the day, for instance in terms of hours and/or minutes and/or seconds. The first piglet birth time may be a timestamp associated with the first piglet birth event.

The method according to the present invention may comprise tracking time from the first piglet birth time, i.e. the time relating to the first piglet birth event.

The method may comprise providing an indication of time passed since the latest piglet birth to a user (e.g. a user of the system). For instance, the time (e.g. in terms of minutes and/or seconds) since the latest piglet birth of one or more particular sows may be provided to a user. Alternatively, or additionally, evolution of time since the latest piglet birth may be illustrated by means of colors and/or columns showing the evolved time since the latest piglet birth in relation to the time when e.g. obstetric aid should be initiated.

The method according to the present invention may comprise determining whether a second event indicative variation succeeding the first event indicative variation is or can be identified in the detected infrared electromagnetic radiation. The second event indicative variation may be indicative of a piglet birth.

The method may comprise initiating a first alarm event if a first time period elapses prior to an affirmative determination of the second event indicative variation. The first time period may start at the first piglet birth time. The first time period may be between 30 and 90 minutes, such as between 45 and 75 minutes, such as 60 minutes.

The second event indicative variation may be identified.

The method according to the present invention may comprise determining a second piglet birth event by means of the identification of the second event indicative variation.

The method may comprise determining a second piglet birth time relating to the second piglet birth event.

The method may comprise determining whether a third event indicative variation succeeding the second event indicative variation is or can be identified in the detected infrared electromagnetic radiation. The third event indicative variation may be indicative of a piglet birth.

The method may comprise initiating a second alarm event if a second time period elapses prior to determining the third piglet birth event. The second time period may start at the second piglet birth time. The second time period may be shorter than the first time period, such as at least 5, 10, or 20 minutes shorter. This is an advantage since the critical time limit (i.e. the time limit that should trigger action e.g. in form of obstetric aid) of a piglet birth is often shorter for piglets born later in a litter, such as after the second piglet birth.

The method according to the present invention may comprise identifying, for instance over a period of time, a first plurality of event indicative variations in the detected infrared electromagnetic radiation and determining a first plurality of piglet birth events by means of the identification of the first plurality of event indicative variations. The first plurality of event indicative variations may include the first event indicative variation and a second event indicative variation occurring subsequent to the first event indicative variation. The first plurality of event indicative variations may include a plurality of event indicative variations subsequent to the second event indicative variation.

The first plurality of piglet birth events may include the first piglet birth event and a second piglet birth event occurring subsequent to the first piglet birth event. The second piglet birth event may be determined by means of the identification of the second event indicative variation. Any piglet birth event subsequent to the first piglet birth event may be determined by means of a respective subsequent identification.

The method according to the present invention may comprise determining a first plurality of birth times including the first birth time and a second birth time, the second birth time relating to the second piglet birth event.

The method according to the present invention may comprise initiating a first alarm event if a first time period elapses prior to determining the second piglet birth event. The first time period may be between 30 and 90 minutes, such as between 45 and 75 minutes, such as 60 minutes.

An alarm event may be in form of an indication visual and/or audio and/or motional indication, such as by means of a light source (in the visible range) and/or a speaker and/or a vibrational creating part.

The first plurality of event indicative variations may include a third event indicative variation occurring subsequent to the second event indicative variation.

The first plurality of piglet birth events may include a third piglet birth event occurring subsequent to the second piglet birth event.

The method may comprise initiating a second alarm event if a second time period elapses prior to determining a piglet birth event, such as the third piglet birth event, being subsequent to a previous piglet birth event. The second time period may be shorter than the first time period, such as at least 5, 10, or 20 minutes shorter.

The method according to the present invention may comprise detecting, at a first plurality of detection zones, infrared electromagnetic radiation from a first plurality of radiation zones.

The first plurality of detection zones may include the first detection zone and a second detection zone. The first plurality of radiation zones may include the first radiation zone and a second radiation zone. The first plurality of radiation zones may include a first plurality of areas of the first delivery zone. The first plurality of areas of the first delivery zone may include the first area of the first delivery zone and a second area of the first delivery zone. The second radiation zone may include the second area of the first delivery zone.

The first plurality of detection zones may be arranged within a first two-dimensional array of detection zones. A two-dimensional array of detection zones may be provided by a thermographic camera.

The method according the present invention may comprise obtaining, at the first two-dimensional array of detection zones, a first image of at least the first plurality of areas of the first delivery zone. The first image may comprise a plurality of image elements. Each image element may have a value that may correspond to a characteristic of the infrared electromagnetic radiation received within a first time range at a respective detection zone of the first two-dimensional array of detection zones.

An image, such as the first image, may be obtained by means of an imaging sensor. An image, such as the first image, may be obtained by means of a thermographic camera (also called an infrared camera or thermal imaging camera). The camera may be a video camera.

The method may comprise obtaining a plurality of images, such as by means of video capturing. For instance, images may be captured at a speed of at least 0.1 images per second (ips) such as at least 0.5, such as at least 1, such as 3. A varying image capture speed may be applied. For instance, the image capture frequency may be increased when radiation of interest (such as a variation, such as a variation exceeding certain threshold criteria) are detected/identified. The increase may be at least 50%.

Identifying an event indicative variation, such as the first, may comprise identifying a first plurality of groups of image elements of the first image. The first plurality of groups of image elements may include a first primary group and a second primary group. The first primary group of image elements may have one or more values or one or more derived values that differ at least by a first threshold value in relation to one or more values of or derived from the second primary group of image elements.

The method according to the present invention may comprise obtaining, at the first two-dimensional array of detection zones, a plurality of images, each image of the plurality of images being of at least the first plurality of areas of the first delivery zone. The plurality of images may include the first image and a second image. The second image may comprise a plurality of image elements that may correspond in number and distribution to the plurality of image elements of the first image, each image element of the second image may have a value that may correspond to a characteristic of the infrared electromagnetic radiation received within a second time range at a respective detection zone of the first two-dimensional array of detection zones.

Identifying the first event indicative variation may comprise identifying a second plurality of groups of image elements of the second image. The second plurality of groups of image elements may include a first secondary group and a second secondary group. The first secondary group of image elements may have one or more values or one or more derived values that differ at least by a second threshold value in relation to one or more values of or derived from a group of image elements may include image elements of the first image.

Identifying an event indicative variation, such as the first, may comprise identifying at least a part of a continuous time-variable variation in the detected infrared electromagnetic radiation.

Identifying an event indicative variation, such as the first, may comprise observing a variation in the detected irradiance. Alternatively or additionally, identifying an event indicative variation, such as the first, may comprise observing a variation in the detected wavelength.

The method may comprise imaging of a plurality of farrowing sows. The plurality of sows may be imaged by means of one image device, such as one thermographic camera. Accordingly, the resulting images may be divided into different parts, each part comprising at least a part of a delivery zone of a particular sow.

The system, such as the processing means, according to the present invention may be configured for carrying out the method according to the present invention.

The system, such as the processing means, may be configured for determining a first piglet birth time relating to the first piglet birth event.

The system, such as the processing means, may be configured for tracking time from the first piglet birth time.

The system, such as the processing means, may be configured for determining whether a second event indicative variation succeeding the first event indicative variation is or can be identified in the detected infrared electromagnetic radiation.

The system, such as the processing means, may be configured for initiating a first alarm event if a first time period elapses prior to an affirmative determination of the second event indicative variation.

The system, such as the processing means, may be configured for determining a second piglet birth event by means of the identification of the second event indicative variation.

The system, such as the processing means, may be configured for determining a second piglet birth time relating to the second piglet birth event.

The system, such as the processing means, may be configured for determining whether a third event indicative variation succeeding the second event indicative variation is or can be identified in the detected infrared electromagnetic radiation.

The system, such as the processing means, may be configured for initiating a second alarm event if a second time period elapses prior to determining the third piglet birth event.

The system, such as a detector including the first detector, may be configured for detecting, at a first plurality of detection zones, infrared electromagnetic radiation from a first plurality of radiation zones, the first plurality of detection zones including the first detection zone and a second detection zone, the first plurality of radiation zones including the first radiation zone and a second radiation zone, the first plurality of radiation zones including a first plurality of areas of the first delivery zone, the first plurality of areas of the first delivery zone including the first area of the first delivery zone and a second area of the first delivery zone, the second radiation zone including the second area of the first delivery zone.

The system, such as a detector including the first detector, may be configured for obtaining, at the first two-dimensional array of detection zones, a first image of at least the first plurality of areas of the first delivery zone, the first image comprising a plurality of image elements, each image element having a value corresponding to a characteristic of the infrared electromagnetic radiation received within a first time range at a respective detection zone of the first two-dimensional array of detection zones.

The system, such as a detector including the first detector or the processing means, may be configured for identifying the first event indicative variation comprises identifying at least a part of a continuous time-variable variation in the detected infrared electromagnetic radiation.

The system, such as a detector including the first detector or the processing means, may be configured for identifying the first event indicative variation including observing a variation in the detected irradiance.

The system may comprise a thermographic camera.

The system according to the present invention may comprise a first device. The system may comprise a plurality of devices, such as 2, 3, 4, or more, including the first device. Each device may comprise a detector, for instance the first device may comprise a first detector.

Each device of the system may comprise a thermographic camera.

A further object of the present invention may be to provide a system, a device, and a method, which automatically detect births of piglets, register the birth times, and alerts personnel if obstetric aid to a particular sow is needed.

It is one object of the invention to provide a device for supervision of a farrowing sow or gilt which automatically detect births of piglets, register the birth times, and alerts personnel if time intervals between subsequent births exceed a preset time limit where obstetric aid to a particular sow is needed.

The method according to the present invention may be computer-implemented.

Each image element of the plurality of image elements may be generated by respective detection elements at the first two-dimensional array of detection zones.

Each radiation zone of the first plurality of radiation zones may include at least a part of the first delivery zone.

A delivery zone of a farrowing sow or gilt may comprise an area at the rear end of the farrowing sow or gilt, such as an area at the vulva, and/or may comprise an area where a newborn piglet will arrive immediately after birth by the farrowing sow or gilt. Immediately may, in this connection, be within 0 to 2 minutes after birth of the piglet. The area where a newborn piglet will arrive immediately after birth may include the area where it be located if it does not move to another.

Image elements may be pixels. The number of image elements of the first image and/or any image of the plurality of image elements may be at least 10, such as at least 100, such as at least 1000. A high number of image elements may be an advantage for identifying an event indicative variation, such as the first event indicative variation, the second event indicative variation, etc. However, a high number of image elements may also require more processing in order to identify an event indicative variation.

The image elements may be arranged in a two-dimensional X by Y array, where X may be at least 10, such as at least 40, and where Y may be at least 10, such as at least 40. The array may be at least 10 by at least 10, at least 20 by at least 20, at least 30 by at least 30.

The value of an image element, such as all image elements of an image, such as the first image, the second image, etc., may be proportional to the irradiance of the infrared radiation captured by the imaging device. Proportional shall be understood as at least substantially proportional, since it is well known that a perfectly linear sensor for capturing infrared radiation may only exist in theory. In praxis, many so-called linear sensors may be at least slightly nonlinear.

Infrared radiation may be electromagnetic radiation with a wavelength in an interval between 1 µm and 100 µm, such as between 3 µm and 30 µm, such as between 7 µm and 15 µm. Infrared electromagnetic radiation in these intervals may be referred to as thermal radiation. Images based on sensing electromagnetic radiation in these intervals may be referred to as thermography.

The variation over time may be within a pre-set pattern or range over a preset time, threshold time, or time-range.

The first plurality of radiation zones may comprise one or more radiation zones that are mutually overlapping. For instance, the first radiation zone and a second radiation zone may overlap, such as almost entirely overlap. The first plurality of radiation zones may comprise identical or almost identical radiation zones.

The first plurality of areas of the first delivery zone may comprise one or more areas that are mutually overlapping.

Identifying an event indicative variation may comprise
  determining one or more foreground regions of the first image as regions where the image elements of the first image have values being above a threshold value,
  defining a plurality of areas in the one or more foreground regions,
  segmenting and combining each area in the one or more foreground regions to acquire a target area, and
  performing recognition of the target area, by using trained kernels, such as a probability density function, based on image element value distribution and based on size.

Identifying an event indicative variation may comprise
  acquiring a first thermographic video image (where the pixel value is proportional to the irradiance of the thermal radiation captured by the imaging device);
  determining at least a foreground region of the image as a region having higher pixel values than surrounding regions;
  identifying a newborn piglet as a foreground region having a number of pixels within a given range, which is determined as a fraction of the total number of pixels in the image, depending on the camera's field of view, and having pixel values higher than a threshold limit.

Identifying an event indicative variation may comprise
  using a Gaussian Mixture Model to determine one or more foreground regions in the second image by comparing the second image to the first image,
  determining that the image elements of the one or more foreground regions have values above a threshold,
  defining a plurality of areas in the one or more foreground regions,
  segmenting and combining each area in the one or more foreground regions to acquire a target area, and
  performing recognition of the target area, by using trained kernels, such as a probability density function, based on image element value distribution as function of time and based on size.

The method and/or the system and/or the device may be configured for automatic supervision of a farrowing sow or gilt by registering the births of individual piglets in the litter. The system may keep track of time intervals between subsequent births and may be capable of alarming personnel that may be in the stable if a preset time limit is exceeded, which may indicate that obstetric aid may be needed. The system may thus serve to avoid exceedingly long, difficult births of individual piglets, which may harm the piglet as well as the sow. The system may comprise a thermographic imaging device, configured for generating a series of current thermal images of at least a portion of the behind of the sow, in which the vulva and piglet are visible during birth, and at least a portion of the area behind the sow, where the newborn piglet rests immediately after its birth. Furthermore, the system may comprise a method for detecting births of piglets, which method makes use of the contrast in surface temperature between the sow and the piglet during and after the birth. The before mentioned system may be integrated into a device comprising a thermographic imaging device, a processing unit for image analysis and data treatment, a storage module, and a communication module. The device according to the present invention may be packaged to withstand the harsh and dirty environment in the stable.

The present disclosure may relate to a system, a method, and a device for supervision of a farrowing sow.

In particular, the present disclosure may relate to a system, a method, and a device for supervision of a farrowing sow by registering the births of individual piglets in the litter and keeping track of time intervals between subsequent births such that personnel can be alarmed if a preset time limit is exceeded and obstetric aid may be needed.

The present invention may include use of a system for monitoring of farrowing sows, wherein a device for monitoring of a farrowing sow is installed at the farrowing crate, such that the delivery zone behind the sow is within the field of view of the device. The device may be permanently installed at the crate, but it may also be mounted by the farmer prior to the birth of the first piglet of a litter or even after the farrowing has started and the first few piglets of the litter have been born.

The device according to the present invention may record and analyze thermographic image data using an algorithm (i.e. a method) to detect births of individual piglets. When the birth of a piglet has been detected, the time of the event is stored in the memory, and a timer is started. If the time since the last birth exceeds a predefined critical time limit, obstetric aid must be provided by the farmer in order to reduce the risk of the subsequent piglet to be stillborn. This information is sent from individual monitoring devices to a central server using a wireless network connection and is presented to the farmer via an application on a portable device, such as a mobile phone, or a screen in the stable. The farmer is thus provided with an overview of the farrowing processes of all the sows, which are monitored at the same time, and he can go to do work in other parts of the farm, since he will be notified when his presence is needed at the farrowing crates.

Figure 18:
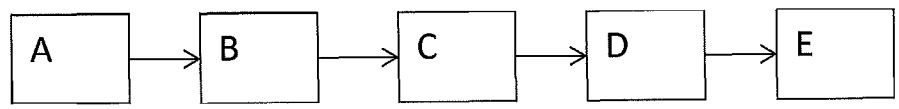
FIG. 18 schematically illustrates a method according to the present invention.

Referring to FIG. 18, the present invention may comprise an algorithm (i.e. a method) for detection of piglet birth according to the following specific description of an embodiment according to the present invention. The algorithm includes parts A-E. An alternative algorithm may include any combination or individual hereof, such as: "C"; "C and D and E"; or "A and B".

The primary objective of the algorithm for automated birth monitoring may be to (i) detect when a piglet is born and to record the time of the event. Other relevant information to be extracted is identification of (ii) whether a newborn piglet is dead or alive, (iii) time of birth of the placenta, and (iv) if the sow is standing up or lying down in the farrowing pen. The recorded time of birth is the primary indicator of when the sow needs assistance: If the time since the last recorded birth exceeds a given time limit, which may be in the range between 30 minutes and 90 minutes and which may differ for different piglets in a litter, obstetric aid must be provided in order to reduce the risk of the subsequent piglet being stillborn. The information in points (ii)-(iv) may be used for statistics and for assessing when farrowing has finished.

The automated birth monitoring is based on automated analysis of thermographic video images. Input from other sensor types, such as video from a visual camera (recording images based on electromagnetic radiation in the visual part of the spectrum), or thermal sensors, such as thermocouples (for calibration of the thermographic image), may be used to support the thermographic data.

The analysis is performed by a computer algorithm, which processes image data (such as live image data or substantially live, i.e. the processing may be carried out within a few minutes (e.g. 1), such as a few seconds (e.g. 10), after the relevant images are captured) in subsequent operations, starting by computationally simple methods (steps A and B, which are described below), which can filter out irrelevant information without using a lot of computational power. Such irrelevant information is thermographic image frames or parts of such frames, which have very low probability of being indicative of (i) the birth of a piglet, (ii) whether the newborn piglet is dead or alive, (iii) birth of the placenta, and (iv) the sow standing up and laying down. Video images are dynamically stored and erased from a buffer in the memory of the device such that the latest five minutes of video data is available for the algorithm. Other storage times/buffers are of course possible for alternative embodiments.

Computationally simple methods, not using a lot of computational power, are beneficial in order to reduce the consumption of electrical power and to reduce the hardware requirements of the device, such as memory use, clock frequency, number of processor kernels, etc.

Data, which is not considered irrelevant, i.e., thermographic image frames, which do not have low probability of being indicative of one of the points (i)-(iv) above, undergo more advanced analysis (steps C-E) as described below. However, the analysis is simplified by the relatively controlled environment: No other objects are expected in the farrowing pen than the sow, piglets, the placenta, faeces, urine, and the background.

(A) Background Subtraction:

This step discriminates between moving and static objects in the images and is based on statistical analysis of movement patterns over time as well as tolerance values. This operation has the following properties, which are adapted for the thermographic video data:

Use of 'Gaussian Mixture Models' for effective discrimination between relatively large motion in the video data caused by potentially interesting activity (e.g. birth of piglet or placenta, moving piglets, sow turning around, stand up or lie down) and relatively small motion in the video data caused by irrelevant activity (e.g. sow breathing or moving a little bit, suckling piglets, camera shaking, change over time in the general intensity level of the thermographic video images). Potentially interesting activity is brought to the foreground of an image. Gaussian Mixture Models is a standard tool in image analysis, which is often used, for example, in outdoor tracking to accommodate for light/shadow changes, trees moving in the wind, etc.

Discrimination using infrared irradiance: To stabilize the method, regions of relatively low infrared irradiance in a thermographic image, i.e., regions with a relatively low pixel value, such as the floor and inventory of the farrowing pen, can be excluded. This leaves only regions of relatively high infrared irradiance, such as sow and piglets, placenta, faeces and urine, in the foreground of the image.

The ability to discriminate between regions of different infrared irradiance in an image, and hence discriminate between objects of different surface temperature, is a major advantage of using infrared thermography, compared to imaging technologies using other wavelengths of the electromagnetic spectrum, for detection of piglets.

(B) Blob Analysis:

This step performs simple statistical analysis on the foreground pixels calculated in the previous step (A):

Only connected groups of pixels matching the minimum size of an interesting object, such as a piglet or the placenta, are kept in the foreground.

Discrimination using infrared irradiance: By continuous statistical analysis of the interval of pixel values in image regions representing warm objects (which are likely to be 'organic', i.e. sow, piglets, placenta, etc.) versus image regions representing cold objects (which are likely to be 'non-organic', i.e. floor, inventory, fixtures etc.) in an image, 'non-organic' blob pixels can be filtered out. Also, it can be assessed if the pixel intensity values in a particular blob are above the previous scale, which may be indicative of birth of a piglet or the placenta or discharge of faeces or urine. The statistical analysis of pixel value intervals in regions representing warm and cold objects is done in connection with a dynamic calibration of the general levels of pixel values.

Again, the ability to discriminate between regions of different infrared irradiance in an image is a major advantage of using infrared thermography, compared to imaging technologies using other wavelengths of the electromagnetic spectrum, for detection of piglets.

Segmentation and combination of blobs: If two foreground regions of an image have similar distributions of pixel values, are only separated by a small distance, and have similar behavior over time, they may be considered as one region. If a foreground region contains two sub-regions, which have different distributions of pixel values, the two sub-regions may be segmented into two separate regions.

(C) Object Detection/Representation:

This operation performs recognition of an object, which is represented by the specific blobs identified in (B). The object can potentially be a piglet, a newborn piglet, the placenta, faeces, urine, or a part of the sow.

A wealth of methods for object detection exist, which, typically, represents a balance between complexity and precision. It is an option to analyze pixel values, the shape of an object, or a combination of both. To keep the detection as simple as possible, here, advantage is taken of the knowledge of the evolution over time of the blobs with respect to pixel value, position, direction, velocity, and (on a larger time scale) movement pattern, which is provided by steps (D) and (E). This enables discrimination between several situations.

A computationally effective detection method is to train a kernel, i.e., a probability density function, on the pixel value distributions of the specific objects, which are based on histograms. The trained kernel operates on the blobs detected in the previous step (B). By using the Mean-Shift Algorithm, the kernel can be adapted to a blob independently of the calibration, which enables measuring of the similarity with the kernel. A pixel value-based kernel can be supplemented by a kernel based on distance and size to enable discrimination between a newborn piglet, the placenta, and faeces or urine.

(D) Next Position Prediction:

This step estimates the position of an object in the next frame based on the object's current velocity and direction. A Kalman filter is used, which is a classical method for this purpose.

(E) Tracking:

This step administers movement patterns (tracking paths) for following motion of an object over several image frames and will have the following properties:

Discriminates between objects coming into the image from the side, i.e. appearing at the edge of the image (e.g. piglets running around) and objects appearing in the center of the image (e.g. birth of piglet and the placenta or the sow moving). This step depends on the variability in mounting positions of the thermographic camera with respect to the farrowing crate and on the optics controlling the thermographic camera's field of view.

Performs a statistical analysis of tracking paths: For example, estimate of whether a newborn piglet is moving or not (dead or alive); estimate of birth of the placenta; estimate of whether the sow stands up or lay down. The step uses knowledge, such as the facts that a newborn piglet and the placenta will exist over several frames and that only one piglet or placenta is born at the time.

According to an aspect of the invention, there is provided a method for detection of newborn piglets based on movie images recorded by a thermographic imaging device, where infrared radiation (such as approx. 7 µm to 15 µm wavelength) is recorded by an array scanner or array sensor (a detector) to produce a two-dimensional image, such as a thermogram, from which the surface temperature of the imaged objects can be estimated. A plurality of two-dimensional images may be produced (generated).

A "thermographic imaging device" or "thermographic camera" is understood as a device capable of generating a digital thermal image of an area, a "thermogram". Thermographic imaging is also known as "thermal imaging", "thermography" or "infrared thermography".

A most critical part of a system for automatic supervision of farrowing sows may be the method for detecting births of piglets. Systems based on visual cameras (i.e. cameras for detecting electromagnetic radiation in the visual part of the spectrum) are challenged by the often low level of light in the crate, in particular during night, and by equipment of the farrowing crate shadowing the view, thus making contour fitting and tracking of the newborn piglet difficult. See photo of sow in farrowing crate in FIG. 13. Furthermore, several live as well as dead piglets may be present behind the sow, which makes it even more complicated to determine whether a new piglet has been born or not. Accordingly, with the prior known methods and apparatus it may be difficult to distinguish between a just borne piglet and a previously borne piglet, such as a piglet from the same litter.

Figure 12:
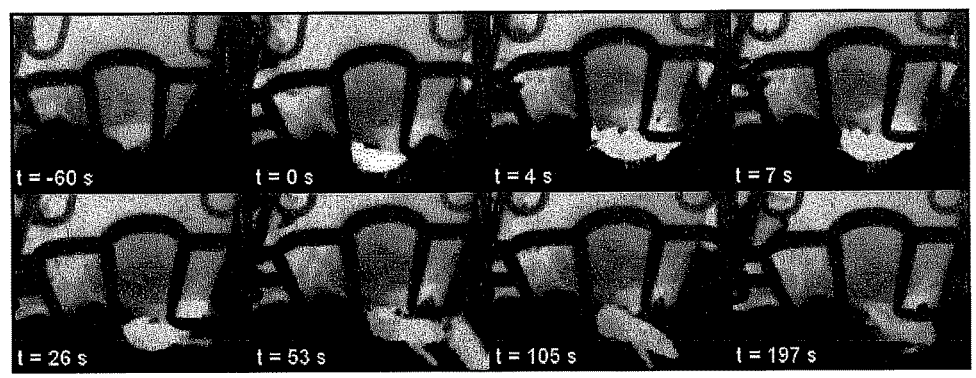
FIG. 12 schematically illustrates a montage of images recorded with a thermal camera at different times.

Using thermal images for detecting piglet births has the advantage of being independent of the light level in the farrowing crate, e.g. 102 of FIG. 1. Furthermore, due to a significant thermal contrast between the newborn piglet and the surroundings, surface temperature (and emissivity) may serve as a good parameter(s) for an algorithm to distinguish between a newborn piglet, the sow, the surroundings, and other piglets, alive or dead, which may be present behind the sow. The (temperature) contrast is illustrated by means of FIG. 12 as well as FIG. 9. FIG. 12 also illustrates how the surface temperature (and/or emissivity) of a newborn piglet may decrease during the first few minutes after birth. The cooling (and/or emissivity) rate may thus also be used in an algorithm for recognizing a newborn piglet.

Detection of a newborn piglet in the series of thermographic images recorded by the supervision device may thus be continuously analyzed by an algorithm. The newborn piglet may have a higher surface temperature than its surroundings, but during a few minutes, it cools down to reach approximately the same surface temperature as the sow and its siblings. The algorithm can make use of both the relative surface temperature and the cooling rate to make a robust detection of a newborn piglet in the thermographic images.

In one or more embodiment of the invention a device (such as a supervision device, such as the device 201 of FIG. 14) may comprise a thermographic camera, may be portable, and/or may be mounted behind the sow.

In one or more embodiment of the invention, the supervision device comprising the thermographic camera is fixed and mounted above the sow.

In one or more embodiment of the invention, such as an alternative embodiment, the supervision device comprising the thermographic camera is fixed to the ceiling and is able to supervise multiple farrowing sows from above.

In one or more embodiment of the invention, image processing and detection of newborn piglets is performed by the portable device comprising the thermographic camera.

In one or more embodiment of the invention, the recorded images are sent to a server on which the image processing and detection of newborn piglets is performed.

The device according to the present invention, such as a super vision device, may comprise signal lights, which will be lit in case of, e.g., a device fault or the need for obstetric aid to the monitored sow. The device may also comprise a visual camera, which can transmit visual images of the sow if time intervals between subsequent births have exceeded a preset time limit and obstetric aid may be needed. This will, or may, for example, enable the farmer to see if the placenta has come out.

Figure 15:
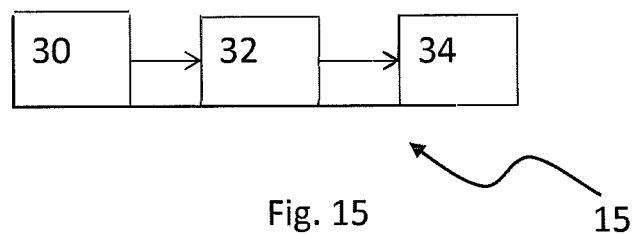
FIG. 15 schematically illustrates a method according to the present invention.

FIG. 15 schematically illustrates a method 15 according to the present invention. The method 15 for observing piglet birth comprises detecting 30, at a first detection zone, infrared electromagnetic radiation from a first radiation zone including at least a first area of a first delivery zone of a first farrowing sow or gilt. The method 15 comprises identifying 32 a first event indicative variation in the detected infrared electromagnetic radiation, the first event indicative variation being indicative of a piglet birth. The method 15 comprises determining 34 a first piglet birth event by means of the identification of the first event indicative variation.

Figure 16:
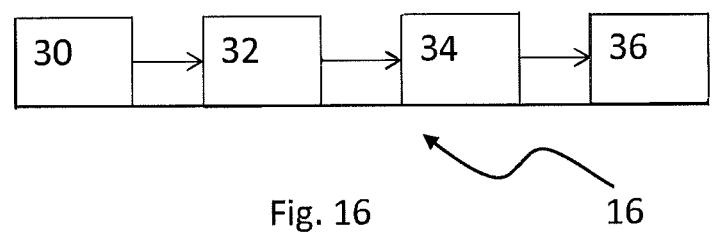
FIG. 16 schematically illustrates a method according to the present invention.

FIG. 16 schematically illustrates a method 16 according to the present invention. For the parts of the method being identical to the method 15 of FIG. 15, references are made to the description of FIG. 15. The method 16 comprises determining 36 a first piglet birth time relating to the first piglet birth event.

FIG. 1 is a schematic illustration of a farrowing sow 101 in an exemplary farrowing crate 102 in which the present invention may be deployed, for example by positioning a device 103 according to the present invention, such as a portable supervision device, behind the sow (i.e. facing towards the rear end of the sow, i.e. towards the delivery zone of the sow).

Figure 2:
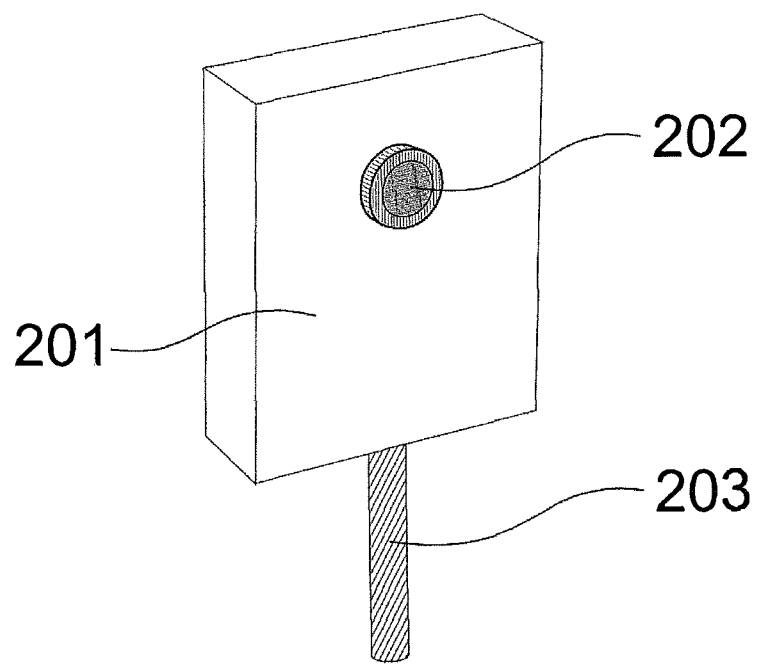
FIG. 2 schematically illustrates a system including a device according to the present invention.

FIG. 2 is a schematic illustration of a supervision device 201 (similar to the device 103 of FIG. 1) comprising a thermal camera 202 (including a detector) and a mount 203 for attaching the device. The mount has a flexible joint, such that the device can be tilted in order for the camera's field of view to be centered on the delivery region behind the farrowing sow.

Figure 3:
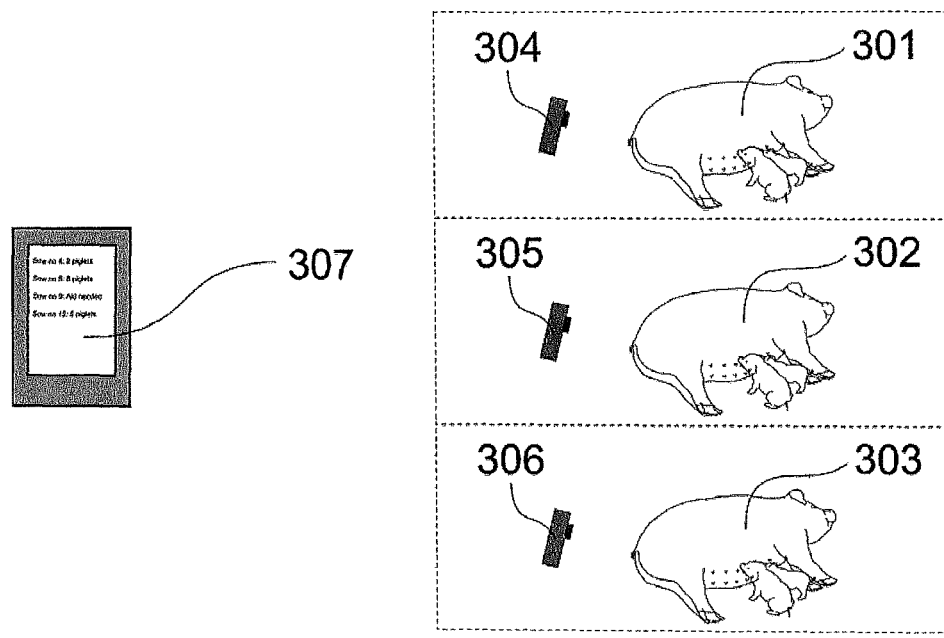
FIG. 3 schematically illustrates a deployed system according to the present invention including a plurality of devices.

FIG. 3 is a schematic illustration of a system for supervision of a plurality of farrowing sows 301-303 in which supervision devices 304-306 located at individual sows detect the births of piglets and communicate the registered birth times to a portable electronic device 307, which provide an overview of the status of all of the sows and produce an alarm if a particular sow needs obstetric aid.

Figure 4:
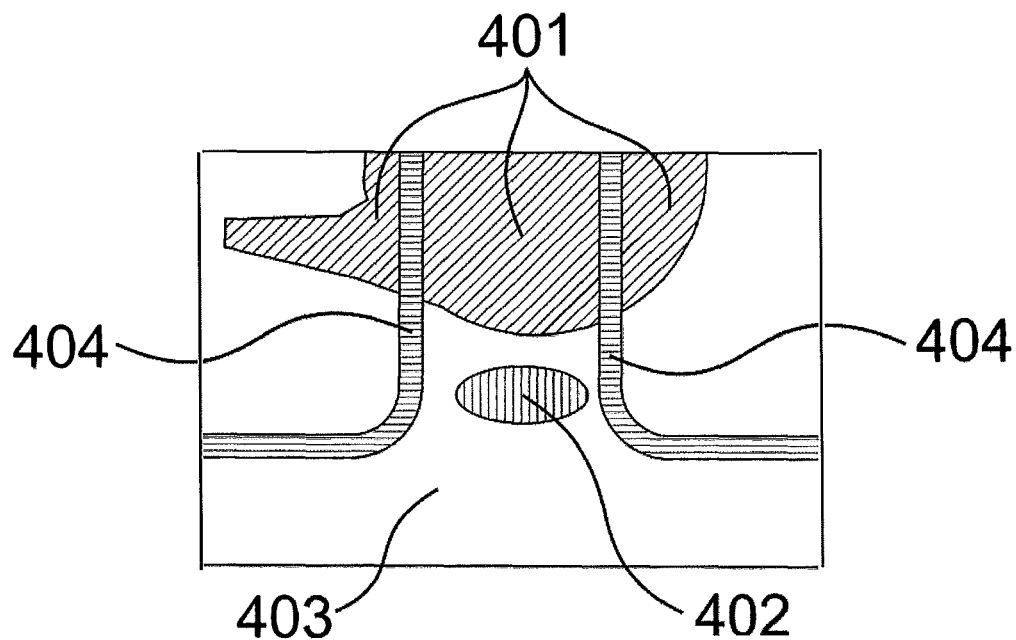
FIGS. 4-8 schematically illustrate a plurality of exemplifying objects and/or areas that illustrates terms of the invention by specific schematic examples.

FIG. 4 is a schematic illustration of typical objects within the field of view of an imaging device according to the present invention for monitoring of a farrowing sow: The behind (rear part) of the sow 401, a newborn piglet 402, the floor 403, and inventory metal tubes 404.

Figure 5:
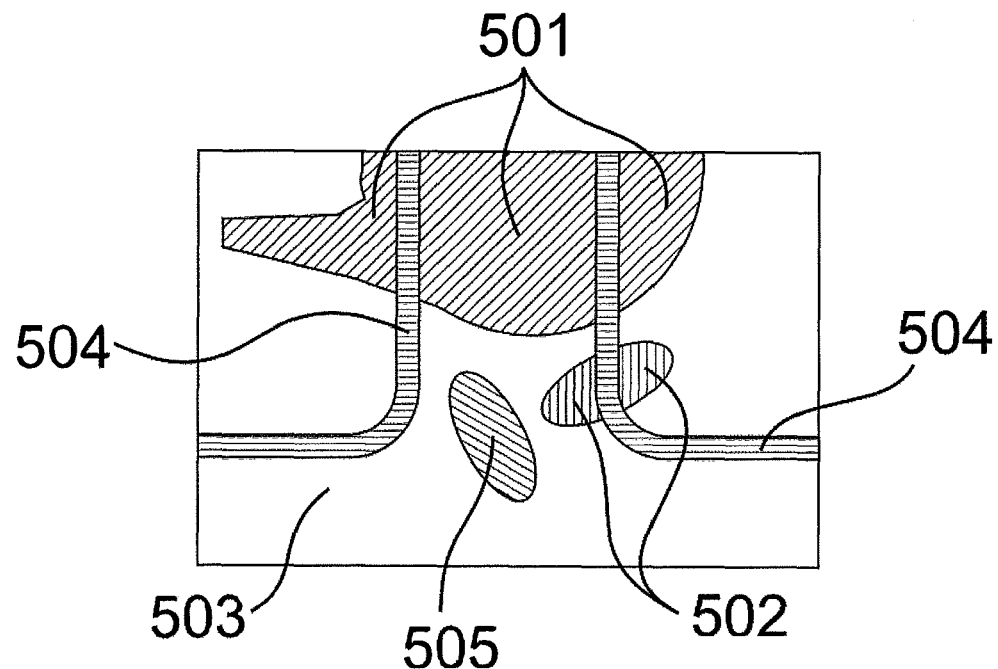

FIG. 5 is a schematic illustration of typical objects within the field of view of an imaging device for monitoring of a farrowing sow: The behind of the sow 501, a newborn piglet 502, the floor 503, and inventory metal tubes 504. An older piglet 505 from the same litter is present in FIG. 5.

Using thermography for detection of piglet births has an advantage, compared to methods that use electromagnetic radiation in the visible part of the spectrum, that discrimination between a newborn piglet and an older piglet is easy due to the higher surface temperature of the newborn piglet. Such higher surface temperature may cause thermal radiation of higher irradiance to be emitted from the newborn piglet, end hence pixel values representing the newborn piglet may have higher values than those representing the older piglet. A newborn piglet 502 may be positioned (i.e. relative to the relevant detector) such that the piglet 502 is partly hidden by the inventory of the farrowing crate 504, and separate parts of the piglet 502 are visible on either side of, e.g., a metal tube 504. In order to detect the piglet 502, the separated parts may need to be recombined (such as being treated as one unit by relevant imaging processing algorithm). Using that the newborn piglet has higher irradiance than the surroundings makes it easier to isolate pixels representing parts of the piglet, and they can thus be recombined using a method for object recognition.

Figure 6:
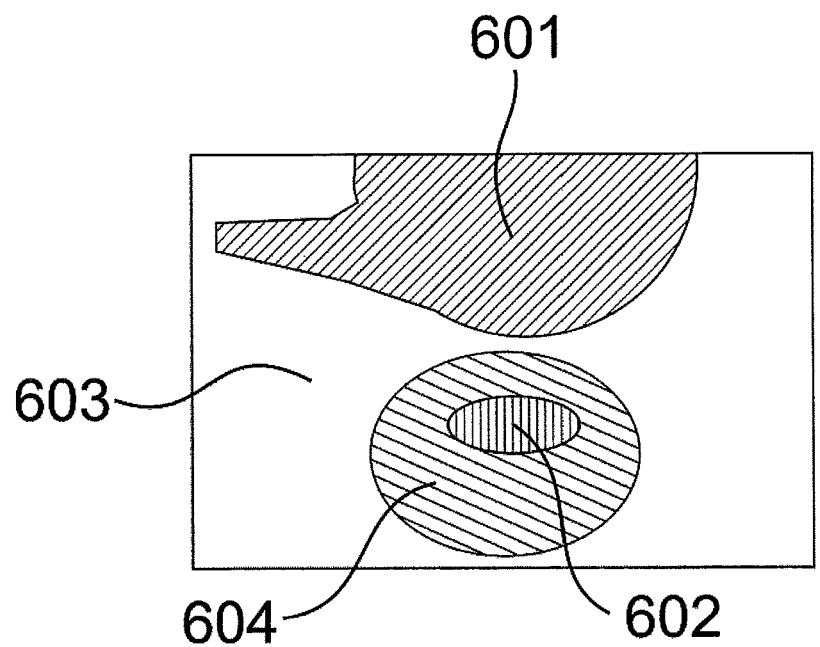

FIG. 6 is a schematic illustration of the behind of a sow 601, a newborn piglet 602, the farrowing crate 603, and a detection region 604 for a single infrared sensor (detector).

Figure 7:
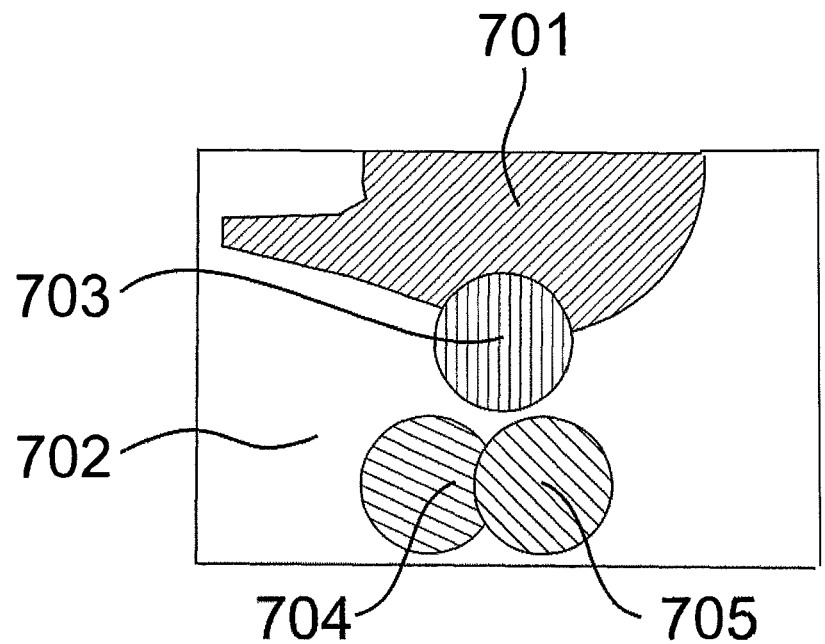

FIG. 7 is a schematic illustration of the behind of a sow 701, the farrowing crate 702, and detection regions for three infrared sensors 703-705. The detection region 703 covers part of the sow 703. The detection regions of the individual sensors 704, 705 overlap.

Figure 8:
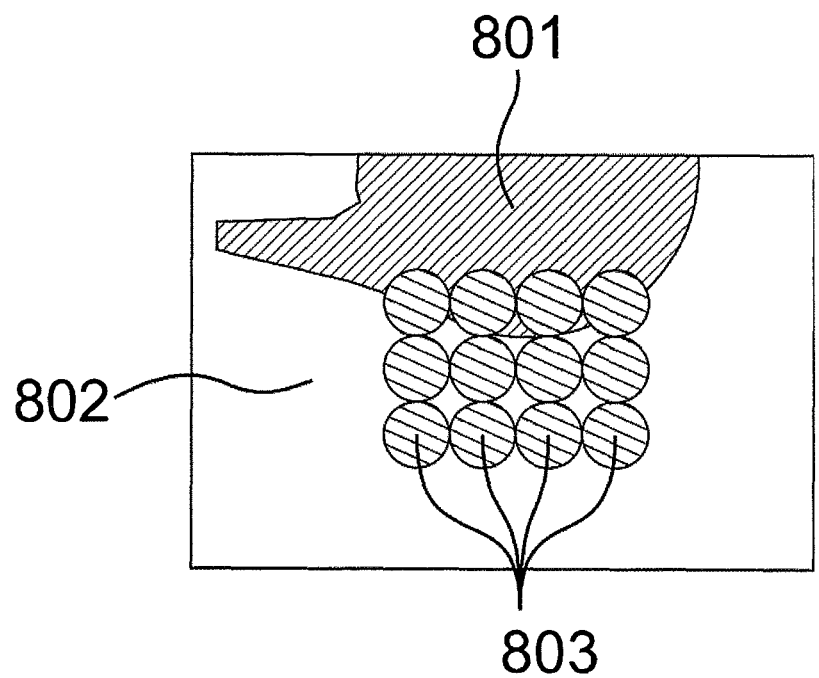

FIG. 8 is a schematic illustration of the behind of a sow 801, the farrowing crate 802, and detection regions of a two-dimensional array 803 of infrared sensors (detectors).

Figure 9:
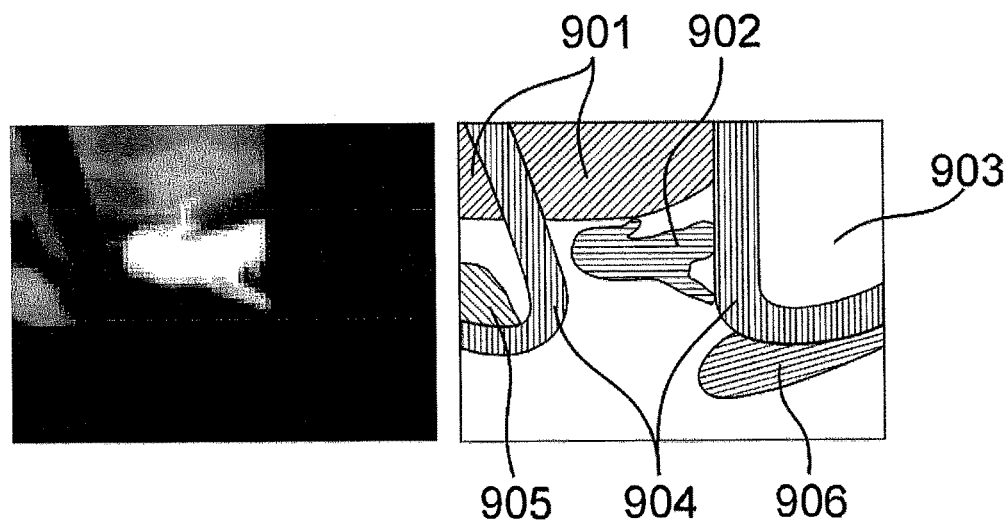
FIG. 9 schematically illustrates an exemplary thermographic image (left) and a corresponding sketch (right) showing silhouettes.

FIG. 9: Left panel: Image frame (60 by 80 pixels) from a thermographic video. The pixel brightness reflects the infrared emission recorded by the camera such that relatively warm objects appear bright and relatively cold objects appear dark in the image. Right panel: Sketch of the image objects in the left panel indicating the silhouettes of: the behind of the sow 901; a newborn piglet 902; an older piglet 905; a stillborn, and hence colder, piglet 906. Furthermore, silhouettes of the metal floor 903 and metal tubes 904, being part of the inventory of the farrowing crate, are indicated in the sketch to the right.

Figure 10:
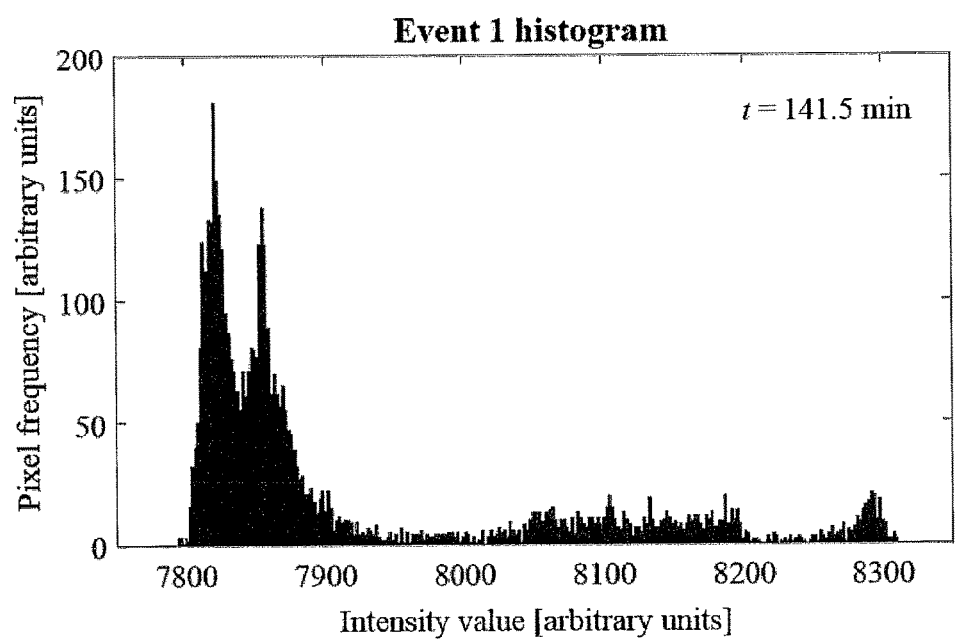
FIG. 10 schematically illustrates a histogram of the thermographic image of FIG. 9.

FIG. 10: Histogram of the thermographic image in FIG. 9 showing pixel frequencies as function of intensity value. Low intensity value correspond to low irradiance, high intensity value correspond to high irradiance. Pixels showing the inventory of the farrowing crate, such as floor 903 and metal tubing 904, have values in the range of approximately 7800 to 7950 units. Pixels showing the sow 901 and older live piglets 905 have values in the range of approximately 8000 to 8200 units. Pixels showing the newborn piglet 902 have values in the range of approximately 8250 to 8325 units.

Figure 11:
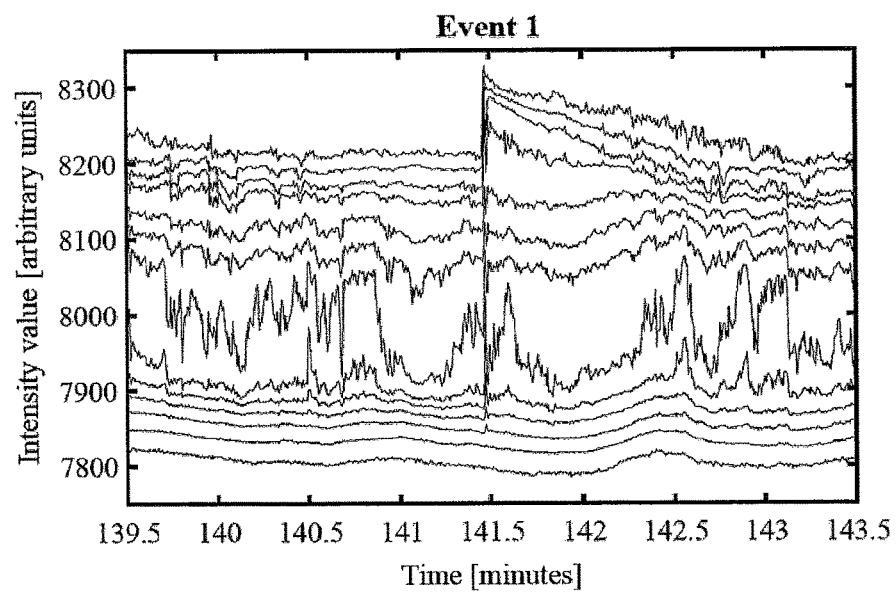
FIG. 11 schematically illustrates a graph showing intensity values of different cumulated histogram percentiles.

FIG. 11: Graph showing the intensity values of different cumulated histogram percentiles (from bottom up: 0%, 20%, 40%, 60%, 70%, 75%, 80%, 85%, 90%, 95%, 97%, 99%, and 100%). This gives an overview of how the histogram of image frames in the thermographic video may evolve over time. The image frame in FIG. 9 is recorded at time t=141.5 minutes. Before the birth of the piglet, at t<141.5 minutes, pixel values are distributed in an interval of approximately 7800 to 8225 units. When a piglet 902 is born at time t=141.5 minutes, a group pixels in the range of 8250 to 8325 units appear in the image. The levels of the highest percentiles (such as 95%-100%) therefore increase in the graph. When born, the piglet has a surface temperature, which is close to the core temperature of the sow, approximately 38° C. However, the newborn piglet cools within a couple of minutes to a surface temperature, which matches that of the sow or is a little colder. The cooling of the newborn piglet is seen from the decrease in the values of the highest percentiles (95%-100%) during the time interval 141.5<t<143 minutes.

Identification of an event indicative variation may include detection of evolution of intensity. This may include detection of an increase in intensity, which happens fast, such as over a time scale of less than 5 seconds, such as less than 2 seconds. Furthermore, a subsequent decrease in intensity (such as a decrease back to an intensity range detected prior to the detected increase, or within at least a few percent thereof, such as at least 5% or at least 2%) happens over a longer time scale, such as at least 30 seconds, such as at least 1 minute, such as at least two minutes.

Identification of an event indicative variation may include detection of increase of intensity of at least 1% of the image elements, such as at least 2% of the image elements. The level of increase may be at least a value of 0.05*(Imax−Imed) larger than Imax, where Imax and Imed are the average of the maximum intensities and the average of the median intensities, respectively, which are calculated in images recorded over at least 30 s in which no newborn piglet is present in the image.

Identification of an event indicative variation may include detection of increase of intensity of a value corresponding to a temperature difference in the imaged objects of at least two degrees Celsius.

FIG. 12 illustrates a montage of images recorded with a thermal camera at different times t showing the backend of a sow lying in a farrowing pen, see e.g. FIGS. 1, 3, 4, 5, and 13. The images may be recorded by a fixed camera. However, for these particular recordings a handheld camera was used. This is visible in the images since the position of background objects is not constant. The grey scale indicates the surface temperature registered by the thermal camera. Black corresponds to approx. 13° C., white corresponds to approx. 32° C. White may correspond to a higher degree than 32° C. A piglet is born at t=0 s. The montage shows how the surface temperature of the newborn piglet decreases during the first few minutes. The significant contrast in surface temperature between the newborn piglet and the sow provides an easy and robust method of birth detection. It also makes it possible to distinguish a newborn piglet from other piglets passing by the backend of the sow, compare the image at t=0 s with the image at t=53 s, in which an older piglet from the same litter is present. At least during the first ½-1 min after birth, the newborn piglet has a higher surface temperature than older piglets and/or the sow.

The changes over time as illustrated by means of FIG. 12 are similar to the changes over time illustrated by means of FIG. 11.

Furthermore, referring to FIG. 4, when a piglet is born, the radiation zone 402, which comprises at least part of the newborn piglet, has a high radiance due to the high surface temperature of the piglet, which has a surface temperature similar to the core temperature of the sow. Furthermore, the surface emissivity of the piglet, is high relative to the surroundings since the piglet is covered with liquid. The radiance of the radiation zone 402 decreases over time due to cooling of the piglet. Furthermore, there is an evaporation of the liquid covering the piglet at birth. After approximately 2 minutes, the surface temperature of the piglet is similar to the surface temperature of the sow. This evolution is seen in FIG. 11 as well as in FIG. 12.

Figure 13:
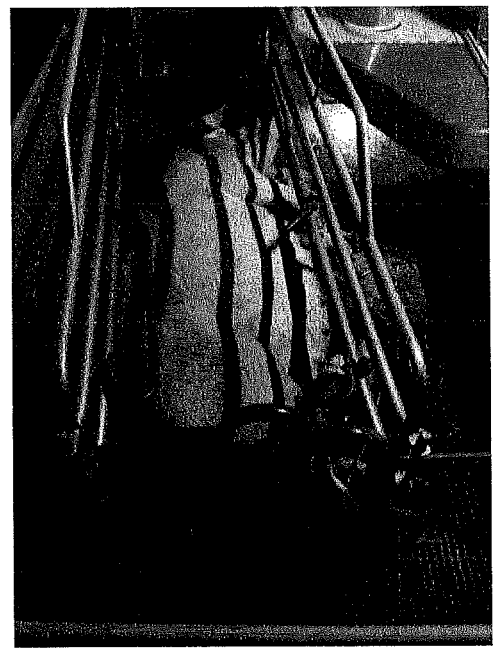
FIG. 13 illustrates a sow in an illustrative crate.

FIG. 13 illustrates a photo of sow in a typical farrowing crate.

Figure 14:
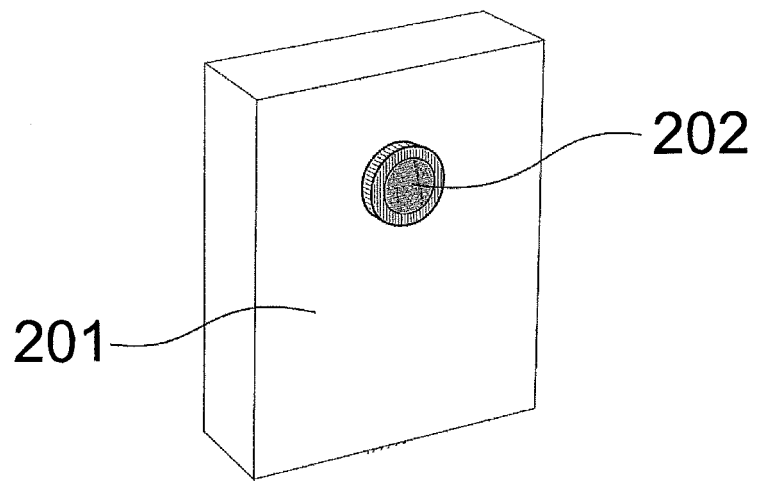
FIG. 14 schematically illustrates a device according to the present invention.

FIG. 14 is a schematic illustration of a supervision device 201 comprising a thermal camera 202. The device of FIG. 14 is similar to the device of FIG. 2, but without the mount 203.

Figure 17:
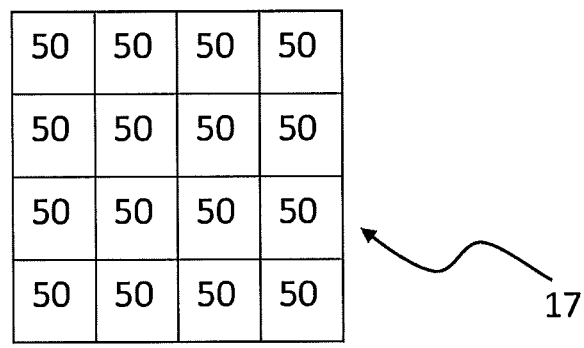
FIG. 17 schematically illustrates a two-dimensional array of detection zones.

FIG. 17 is a schematic illustration of a two-dimensional array 17 of detection zones 50.

The present invention may be carried out according to any of the following items 1-10:

1. A device for supervision of a farrowing sow or gilt by registering the births of individual piglets, the device comprising:
    at least a thermographic imaging device;
    a data communication unit; and
    a processing unit for treatment of recorded thermographic images.

2. A device according to Item 1, comprising:
    an algorithm for treatment of said thermographic images to detect if a newborn piglets is present in an image and recording and storing of the image capture time of an image showing a newborn piglet.

3. A device according to Item 2, comprising:
    an algorithm for keeping track of time intervals between subsequent births such that personnel can be alarmed if a preset time limit is exceeded and obstetric aid may be needed.

4. A device according to Item 1, comprising:
    a unit for reading an identification code, such as a barcode, a QR-code, a written code, or an RFID-tag, to identify the farrowing crate, in which the device is used, or the sow, which is being monitored by the device.

5. A method for detecting births of piglets, the method comprising:
    recording timed thermographic images of a farrowing sow or gilt, said images comprising at least a portion of the behind of the sow, in which the vulva and piglet are visible during birth, and at least a portion of the area behind the sow, where the newborn piglet rests immediately after its birth;
    treatment of said thermographic images to detect the sow;
    treatment of said thermographic images to detect if a newborn piglets is present in an image; and
    recording and storing of the image capture time of an image showing a newborn piglet.

6. A method according to Item 5, the method comprising:
    estimating a surface temperature of the sow from pixel values in said thermographic image; and
    detection of a newborn piglet as a group of pixels in said thermographic image having a range of values corresponding to a surface temperature which is warmer than that of the sow.

7. A method according to Item 5, the method comprising:
    detection of a newborn piglet as a group of pixels in said thermographic image having a positive cooling rate.

8. A system for automatic supervision of a farrowing sow or gilt by registering the births of individual piglets in the litter, said system comprising:
    at least a thermographic imaging device, configured for generating a series of current timed thermographic images of at least a portion of the behind of the sow, in which the vulva and piglet are visible during birth, and at least a portion of the area behind the sow, where the newborn piglet rests immediately after its birth; and
    a method for detecting births of piglets, which makes use of the contrast in surface temperature between the sow and the piglet during and after birth as measured with the thermographic imaging device.

9. A system according to Item 8, said system comprising:
    a computing unit keeping track of time intervals between subsequent births such that personnel can be alarmed if a preset time limit is exceeded and obstetric aid may be needed;
    a processing unit for real-time image analysis and data treatment; and
    a communication module for transmitting images and alarms.

10. A system according to Item 9 in which personnel is alerted by receiving an alarm on a portable electronic device, such as a telephone, which is able to communicate with a plurality of individual supervision units, such that a plurality of farrowing sows are simultaneously supervised.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claims are intended to cover alternatives, modifications, and equivalents.

The invention claimed is:

1. A method for observing piglet birth, the method comprising
    detecting, at a first plurality of detection zones arranged within a first two-dimensional array, infrared electromagnetic radiation within a wavelength interval between 7 µm and 15 µm from a first plurality of radiation zones, including detecting, at a first detection zone, infrared electromagnetic radiation from a first radiation zone, the first plurality of detection zones including the first detection zone and a second detection zone, the first plurality of radiation zones including the first radiation zone and a second radiation zone, the first plurality of radiation zones including a first plurality of areas of a first delivery zone of a first farrowing sow or gilt, the first plurality of areas of the first delivery zone including a first area of the first delivery zone and a second area of the first delivery zone, the first radiation zone including at least the first area of the first delivery zone, the second radiation zone including the second area of the first delivery zone,
    obtaining, at the first two-dimensional array of detection zones, a first image of at least the first plurality of areas of the first delivery zone, the first image comprising a plurality of image elements, each image element having a value corresponding to a characteristic of the infrared electromagnetic radiation received within a first time range at a respective detection zone of the first two-dimensional array of detection zones, identifying a first event indicative variation in the detected infrared electromagnetic radiation by means of the first image, the first event indicative variation being indicative of a piglet birth, and determining a first piglet birth event by means of the identification of the first event indicative variation.

2. The method according to claim 1, comprising determining a first piglet birth time relating to the first piglet birth event.

3. The method according to claim 2, comprising tracking time from the first piglet birth time.

4. The method according to claim 2, comprising determining whether a second event indicative variation succeeding the first event indicative variation is or can be identified in the detected infrared electromagnetic radiation, the second event indicative variation being indicative of a piglet birth, and initiating a first alarm event if a first time period elapses prior to an affirmative determination of the second event indicative variation, the first time period starting at the first piglet birth time and being between 30 and 90 minutes.

5. The method according to claim 4, wherein the second event indicative variation is identified, the method comprising determining a second piglet birth event by means of the identification of the second event indicative variation, determining a second piglet birth time relating to the second piglet birth event, determining whether a third event indicative variation succeeding the second event indicative variation is or can be identified in the detected infrared electromagnetic radiation, the third event indicative variation being indicative of a piglet birth, and initiating a second alarm event if a second time period elapses prior to determining the third piglet birth event, the second time period starting at the second piglet birth time and being shorter than the first time period.

6. The method according to claim 1, wherein identifying the first event indicative variation comprises identifying a first plurality of groups of image elements of the first image.

7. The method according to claim 6, wherein the first plurality of groups of image elements includes a first primary group and a second primary group, the first primary group of image elements having one or more values or one or more derived values that differ at least by a first threshold value in relation to one or more values of or derived from the second primary group of image elements.

8. The method according to claim 6, wherein the first image is a first thermographic video image and wherein identifying the first event indicative variation comprises:

determining at least a foreground region of the image as a region having higher pixel values than surrounding regions;

identifying a newborn piglet as a foreground region having a number of pixels within a given range, which is determined as a fraction of the total number of pixels in the image, depending on the camera's field of view, and having pixel values higher than a threshold limit.

9. The method according to claim 8, wherein the pixel values of the pixels are proportional to the irradiance of the thermal radiation captured by the imaging device.

10. The method according to claim 1, wherein the plurality of image elements are arranged in a two-dimensional array being at least 10 by at least 10.

11. The method according to claim 1, comprising obtaining, at the first two-dimensional array of detection zones, a plurality of images, each image of the plurality of images being of at least the first plurality of areas of the first delivery zone, the plurality of images including the first image and a second image, the second image comprising a plurality of image elements corresponding in number and distribution to the plurality of image elements of the first image, each image element of the second image having a value corresponding to a characteristic of the infrared electromagnetic radiation received within a second time range at a respective detection zone of the first two-dimensional array of detection zones.

12. The method according to claim 11, wherein identifying the first event indicative variation comprises identifying a second plurality of groups of image elements of the second image, the second plurality of groups of image elements including a first secondary group and a second secondary group, the first secondary group of image elements having one or more values or one or more derived values that differ at least by a second threshold value in relation to one or more values of or derived from a group of image elements including image elements of the first image.

13. The method according to claim 1, wherein identifying the first event indicative variation comprises identifying at least a part of a continuous time-variable variation in the detected infrared electromagnetic radiation.

14. The method according to claim 1, wherein identifying the first event indicative variation comprises observing a variation in the detected irradiance.

15. A system configured for observing piglet birth, the system comprising a first detector comprising a first plurality of detection zones arranged within a first two-dimensional array of detection zones, the first detector being configured for detecting infrared electromagnetic radiation within a wavelength interval between 7 μm and 15 μm from a first plurality of radiation zones, including detecting, at a first detection zone, infrared electromagnetic radiation from a first radiation zone, the first plurality of detection zones including the first detection zone and a second detection zone, the first plurality of radiation zones including the first radiation zone and a second radiation zone, the first plurality of radiation zones including a first plurality of areas of a first delivery zone of a first farrowing sow or gilt, the first plurality of areas of the first delivery zone including a first area of the first delivery zone and a second area of the first delivery zone, the first radiation zone including at least the first area of the first delivery zone, the second radiation zone including the second area of the first delivery zone, the first detector being configured for obtaining a first image of at least the first plurality of areas of the first delivery zone, the first image comprising a plurality of image elements, each image element having a value corresponding to a characteristic of the infrared electromagnetic radiation received within a first time range at a respective detection zone of the first two-dimensional array of detection zones, and image processing means configured for identifying a first event indicative variation in the detected infrared electromagnetic radiation by means of the first image and configured for determining a first piglet birth event by means of the identification of the first event indicative variation.

16. The system according to claim 15, configured for carrying out the method comprising:

detecting, at a first plurality of detection zones arranged within a first two-dimensional array, infrared electromagnetic radiation within a wavelength interval between 7 μm and 15 μm from a first plurality of radiation zones, including detecting, at a first detection zone, infrared electromagnetic radiation from a first radiation zone, the first plurality of detection zones including the first detection zone and a second detection zone, the first plurality of radiation zones including the first radiation zone and a second radiation zone, the first plurality of radiation zones including a first plurality of areas of a first delivery zone of a first farrowing sow or gilt, the first plurality of areas of the first delivery zone including a first area of the first delivery zone and a second area of the first delivery zone, the first radiation zone including at least the first area of the first delivery zone, the second radiation zone including the second area of the first delivery zone, obtaining, at the first two-dimensional array of detection zones, a first image of at least the first plurality of areas of the first delivery zone, the first image comprising a plurality of image elements, each image element having a value corresponding to a characteristic of the infrared electromagnetic radiation received within a first time range at a respective detection zone of the first two-dimensional array of detection zones, identifying a first event indicative variation in the detected infrared electromagnetic radiation by means of the first image, the first event indicative variation being indicative of a piglet birth, and determining a first piglet birth event by means of the identification of the first event indicative variation.

17. The system according to claim 15, comprising a first device comprising the first detector.

* * * * *